United States Patent
Watter, deceased

[15] 3,699,690
[45] Oct. 24, 1972

[54] METHOD OF LAYING PIPELINE AND MEANS THEREOF

[72] Inventor: Michael Watter, deceased, late of 1924 Rittenhouse Square, Philadelphia, Pa. 19103 by Doris Watter, sole executrix

[22] Filed: May 28, 1971

[21] Appl. No.: 147,959

[52] U.S. Cl. .....................61/72.1, 138/105, 248/49
[51] Int. Cl. ..............................F16l 1/00, F16l 3/00
[58] Field of Search............61/72.1, 72.2, 72.5, 72.7, 61/42, 43, 50; 138/105, 106; 248/49

[56] References Cited

UNITED STATES PATENTS 3,650,299  3/1972  Sieler et al..................138/149

FOREIGN PATENTS OR APPLICATIONS 984,183  2/1965  Great Britain..............61/72.1
6,413,932  6/1966  Netherlands..............138/106

*Primary Examiner*—Jacob Shapiro

[57] ABSTRACT

A method of supporting oil pipe beneath the ground by pneumatic inflated sections. The pneumatic inflated sections may be half sections shaped to receive the pipe.

8 Claims, 2 Drawing Figures

INVENTOR

MICHAEL WATTER

METHOD OF LAYING PIPELINE AND MEANS THEREOF

BACKGROUND OF THE INVENTION

The present invention refers to a method of laying and supporting pipe line and in particular using air inflated sections.

At present with the large oil deposits being developed in Alaska the problem has arisen as to the best means of transporting the oil out of Alaska. One of the means suggested has been the use of tankers but experience has shown that with tankers there is eventually a mishap of some type causing spills which cause great damage to the fish and wildlife.

An alternative method is through the use of a pipeline across parts of Alaska. The present invention refers to this method. But this method also has many problems to consider. When the pipeline is laid across country above ground it requires substantial supports which must be firmly anchored below the permafrost. In addition, the prevalence of high powered rifles by people in those regions has also posed problems since stray bullets, deliberately or accidentally, tend to penetrate and perforate the pipes.

Alternatively the pipes can be laid beneath the ground. When such pipes are laid below ground the heat of the oil flowing through the pipes due to preheating of the oil or heat of friction as it flows through the pipe can cause thawing of the ground around it and especially above it, causing improper support of the pipes and affecting the ecology of the surrounding area in an undesirable manner.

To prevent this thawing around the pipes, the underground pipes usually have to be laid with about four feet of gravel beneath them and another four feet of gravel above them. Considering the miles of pipeline, this much gravel poses difficulties in order to obtain it and transport it to where needed. The present invention proposes a solution to these difficulties.

SUMMARY OF THE INVENTION

It is an object of the present invention to provide a support for pipes carrying a fluid at a temperature differing from the surrounding material and insulate the surrounding material from the effects of the differing temperature.

It is a further object of the present invention that the support and insulating means can be easily transported to and assembled at the place of use having a minimum of weight and bulk while being transported.

It is a still further object of the present invention to support and insulate from the surrounding ground, underground pipes carrying heated oil products through normally low temperature ground without causing a thawing or change in the surrounding ground temperature.

Basically the present invention comprises pneumatically inflated sections for supporting the pipes of the pipeline and additional pneumatically inflated sections to complete the coverage of the pipes.

BRIEF DESCRIPTION OF THE DRAWINGS

Further objects and advantages of the invention will be readily apparent from the following specification, taken in conjunction with the accompanying drawing wherein.

Figure 1:
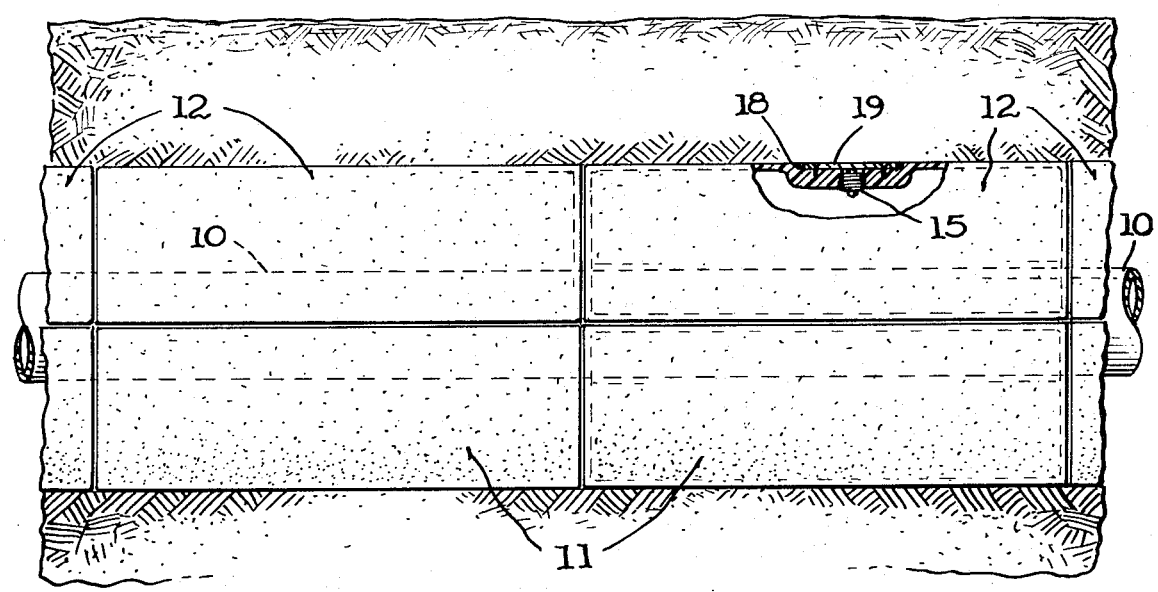
FIG. 1 is a fragmentary longitudinal partially sectioned view of an underground pipe installation illustrating a pipe with a covering of pneumatically inflated sections of the present invention.

Referring to the drawings there is shown a pipe 10 through which oil or similar fluid is transported at a raised temperature due either to preheating of the oil before transporting it through the pipe or due to heat generated by its movement through the pipe.

Pipe 10 has been buried underground but is supported by lower pneumatically inflated section 11 and covered over by pneumatically inflated section 12 which are brought to the site and inflated there through air valves 14 and 15 located in the lower and upper sections respectively.

Each of air valves 14 and 15 are shown located in an indentation 17 and 18 respectively for protection of the valve underground. A cover 19 is inserted over the indentation 18 for further valve protection. Such a cover may also be used over indentation 17 in lower section 11 but due to the covering by upper section 12 it is not considered as necessary as in the previously discussed case. Either of the valve locations may be used in either section, or other valve locations may be used. The location of air valve 15 in section 12 is suggested for its accessibility if necessary to deflate section 12 for accessibility to pipe 10 with less digging.

Figure 2:
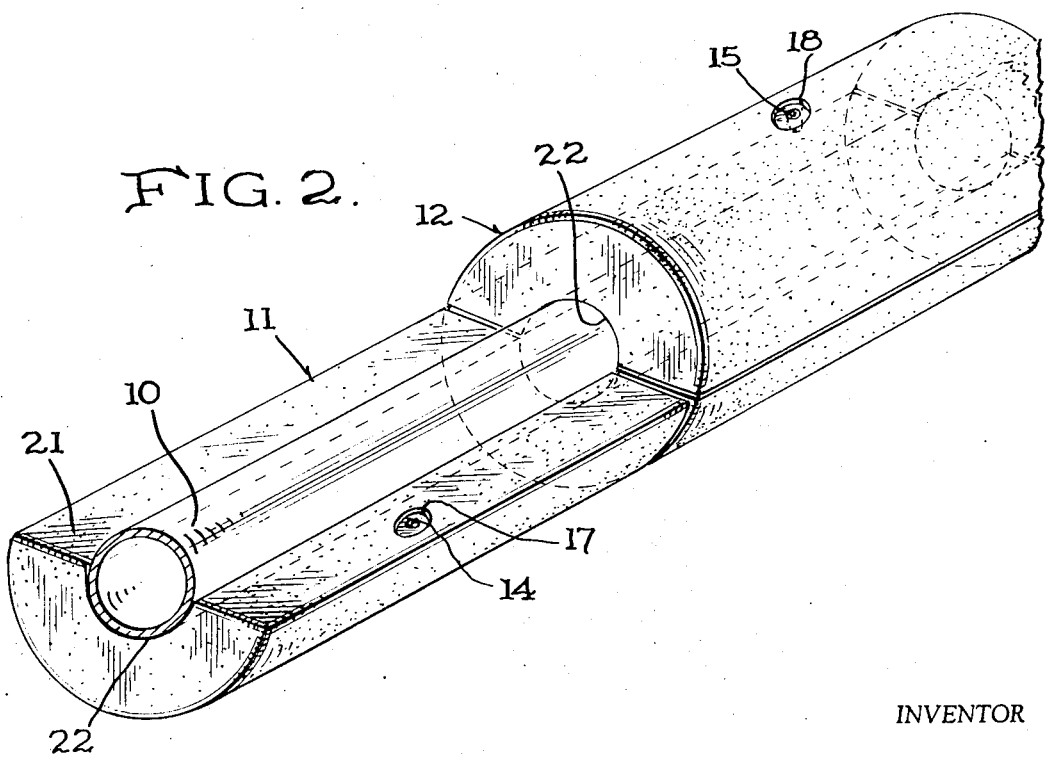
FIG. 2 is a perspective view of the pipe and inflated sections of FIG. 1 with a section removed.

Each of sections 11 and 12 in the preferred embodiment shown has the shape of half of a solid cylinder sliced longitudinally with flat surface 21 having a longitudinal groove 22 centered therein conforming to the shape of pipe 10 so as to receive either the lower or upper half of pipe 10 therein as shown in FIG. 2.

There need not be a tight fit of sections 11 and 12 about pipe 10 when it is laid in groove 22 since the heat from the hot oil will cause expansion of the pipe and tightening of the sections about the pipe.

Instead of the cylindrical shape formed by the outer surfaces of complementary lower and upper sections, other shapes such as to form a rectangular outer surface could be used, but this would of course necessitate additional digging without any real increase in insulation properties.

Although the sections 11 and 12 have been described as pneumatically inflated sections and air may be used for inflation purposes, other fluids or gases may be substituted therein if the expense justifies in order to utilize the particular properties of that gas or fluid. For example, some inert gas may be used to decrease deterioration effects on the material of the sections, depending on the material used, or some gas such as carbon dioxide may be used for its fire extinguishing advantages.

Sections 11 and 12 may be made from a rubber or plastic composition which is least affected by the chemical content of the surrounding soil and the temperature extremes close to pipe 10 and away from it in contact with the surrounding soil. Such materials are available for this use.

It may be desired to divide sections 11 and 12 into compartments by interior dividing walls, which may of course necessitate additional air valves therein, in order to increase the strength of the sections. This could be done within the concept of the present invention but such results could also be obtained by decreasing the longitudinal size of the sections without decreasing the radial sizes. This would allow easier handling of the sections and probably result in cheaper manufacture of the sections needed for a certain length of pipe over the more complicated compartmented sections.

Also, it should be noted that although the drawings depict underground installation, such installation may be underwater which would necessitate anchoring of the upper section especially, to prevent floatation while retaining insulating characteristics of the sections.

It will be obvious to those skilled in the art that various changes may be made without departing from the scope of the invention and the invention is not to be considered limited to what is shown in the drawings and described in the specification.

What is claimed is:

1. A method of laying pipeline while insulating and supporting the pipe comprising the steps of
    placing a plurality of axially aligned inflated bag sections each having an axial recess shaped in cross-section similar to the cross-section of at least a portion of the pipe to be received therein,
    placing the pipe on said plurality of inflated bag sections in said recesses,
    placing a plurality of complementary inflated bag sections over the section of pipe and said first mentioned plurality of inflated sections, to thereby enclose said pipe.

2. The method of claim 1 wherein said inflated sections are filled with an inert gas.

3. The method of claim 1 wherein said inflated sections are filled with carbon dioxide.

4. A pipe supporting and insulating member comprising:
    an elongated flexible inflatable bag member having a longitudinally extending recess in a surface thereof for receiving and supporting a longitudinally extending pipe in said recess and valve means in said member for inflating the same.

5. The covering of claim 4, further characterized by said air valve means having a valve in an indentation in said section.

6. The covering of claim 4, further characterized by
    said sections each having a semi-circular outer surface on the side away from the pipe, and
    a flat surface on a side opposite said outer surface extending between the edges of said outer surface and having a semi-circular groove extending longitudinally along said flat surface between said edges.

7. The covering of claim 4, further characterized by said inflated sections containing an inert gas.

8. The covering of claim 4, further characterized by said inflated sections containing carbon dioxide.

* * * * *